United States Patent [19]
Hyatt

[11] 4,427,142
[45] Jan. 24, 1984

[54] METHOD OF AND APPARATUS FOR GRIT BLAST DAMAGE FREE SCORE INITIATION

[75] Inventor: Charles J. Hyatt, Cheswick, Pa.

[73] Assignee: PPG Industries, Inc., Pittsburgh, Pa.

[21] Appl. No.: 289,028

[22] Filed: Aug. 3, 1981

[51] Int. Cl.³ .............................................. C03B 33/02
[52] U.S. Cl. .......................................... 225/2; 83/14; 83/22; 83/168; 83/863; 83/880; 83/886; 225/96; 225/103
[58] Field of Search ................. 83/880, 881, 886, 863, 83/14, 22, 168; 225/2, 96.5, 96, 103

[56] References Cited

U.S. PATENT DOCUMENTS

| | | |
|---|---|---|
| 3,244,337 | 4/1966 | Curtze et al. ............................ 225/2 |
| 3,865,293 | 2/1975 | Ernsberger et al. .................... 225/2 |
| 3,865,673 | 2/1975 | DeTorre ................................. 161/1 |
| 3,979,243 | 9/1976 | DeTorre ............................. 156/109 |
| 4,027,562 | 6/1977 | Bonaddio ................................. 83/8 |
| 4,057,184 | 11/1977 | Michalik ................................. 225/2 |
| 4,102,227 | 7/1978 | Simko ..................................... 83/7 |
| 4,137,803 | 2/1979 | Goldinger ............................ 83/881 |
| 4,213,550 | 7/1980 | Bonaddio ............................... 225/2 |

Primary Examiner—Frank T. Yost
Attorney, Agent, or Firm—William D. West; Donald Carl Lepiane; Lee Patch

[57] ABSTRACT

A damage-free score is initiated in a moving ribbon of glass by projecting grit material toward the surface of the ribbon in a controlled manner to create a selected zone of surface damage thereon. The selected zone of surface damage is then advanced under a scoring wheel sized, shaped, and loaded to generate the damage-free score upon encountering an appropriate zone of surface damage.

13 Claims, 4 Drawing Figures

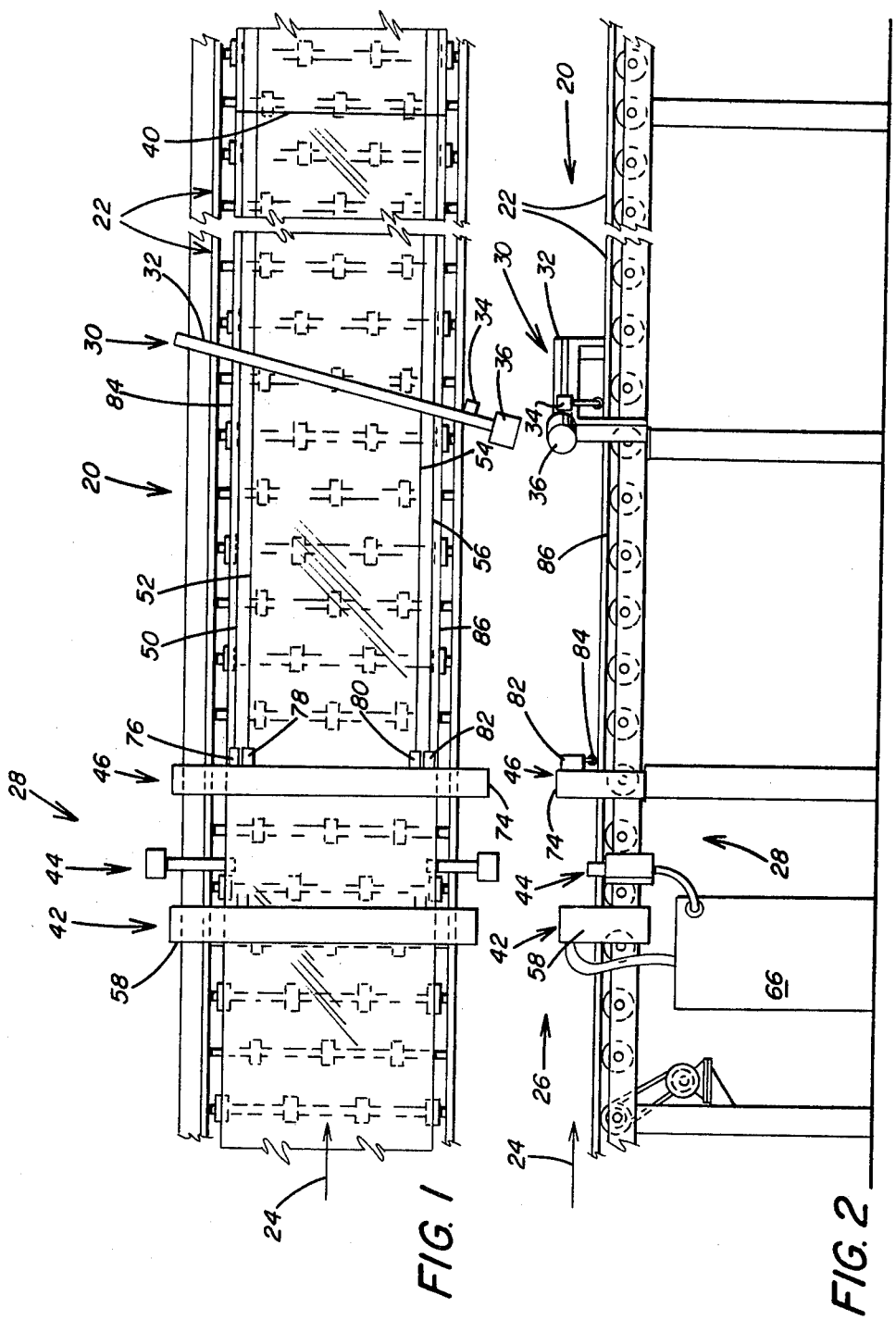

METHOD OF AND APPARATUS FOR GRIT BLAST DAMAGE FREE SCORE INITIATION

FIELD OF THE INVENTION

This invention relates to a method of and apparatus for initiating a damage-free score in a piece of refractory material, and more particularly, to a method of and apparatus for generating a zone of surface damage on a refractory piece to initiate a damage-free score.

DISCUSSION OF THE TECHNICAL PROBLEM

It is desirable to impose a damage-free score in a refractory piece to sever same because the resultant severed edge is essentially in a pristine condition, having essentially maximum edge strength. Such damage-free scores are generally known as subsurface scores and/or pseudosubsurface scores. As taught in U.S. Pat. No. 3,979,243, a damage-free score may be initiated at a zone of damage on the surface of the refractory piece. The exact mechanism for such initiation is not fully understood; however, it is believed that the certainty of damage-free score initiation depends upon the configuration of the zone of surface damage with which the damage-free scoring wheel interacts, particularly where the refractory piece is continually moving, e.g., a moving ribbon of glass.

Various techniques exist in the art for initiating a damage-free score at a zone of damage on a refractory piece. For example, U.S. Pat. No. 3,979,243 teaches that an initial force may be applied to the scoring wheel which is 20% greater than the selected scoring force, to thereby damage the surface to initiate the damage-free score. Also disclosed is a technique of impacting the surface of the piece with the scoring wheel to damage the surface and initiate the damage-free score.

Such a technique might not prove satisfactory, however, when utilized with a wide range of glass thicknesses and scoring wheel dimensions. For example, too great an initial biasing force might fracture the entire thickness of a thin glass ribbon, while insufficient force could lead to score initiation reliability problems. In addition to sharing the before-mentioned difficulties, impacting the refractory piece with the scoring wheel could detrimentally affect the scoring wheel and its control mechanism.

U.S. Pat. No. 4,057,184 teaches that the surface of a refractory piece may be tapped with a rigid object, impacted with a scoring wheel, or have a scoring wheel pivotally urged against it to damage the surface to initiate a damage-free score.

This technique, in addition to experiencing the limitations associated with impacting, which may make it unsatisfactory for use with a wide range of glass thicknesses and scoring wheel dimensions, also may be hazardous to personnel who manually act upon the scoring wheel, particularly when practiced upon a moving ribbon of glass.

U.S. Pat. No. 4,213,550 teaches that a damage free score may be imposed in a continually moving refractory piece by providing a zone of surface damage thereon with a pointed stylis or conventional scoring wheel, and thereafter moving an aligned damage-free scoring facilities through the zone of damage.

This technique when practiced with the impacting stylis will share the limitations associated with impacting, and in either embodiment is limited by the precise alignment required between the upstream damage imposing facility and the downstream damage-free scoring wheel, because only a point and a narrow line of surface damage are created by the stylis and conventional scoring wheel, respectively.

Thus, there exists a need for a method of and apparatus for initiating a damage-free score which may be reliably utilized for a wide range of glass thicknesses and scoring wheel dimensions, and which is practical for use with a continually moving ribbon of glass.

SUMMARY OF THE INVENTION

The present invention provides apparatus for and a method of initiating a damage-free score in a piece of refractory material which may be utilized on a continually moving ribbon of glass to reliably and controllably initiate damage-free scores over a wide range of operating conditions. The invention includes means for projecting particles of grit material toward the surface of the refractory piece to impose a controlled zone of surface damage. A damage-free scoring facility and the zone of surface damage are moved relative to one another along a movement path to an intersection point therebetween to initiate a damage-free score. The size and depth of the zone of surface damage is precisely and advantageously controlled to yield reliable damage-free score initiation over a wide range of ribbon thicknesses. The depth of the zone of surface damage is controlled by controlling the force with which the grit material is projected toward the ribbon surface. The length of the zone of surface damage, i.e., the dimension in the direction of the movement path, is determinable by controlling the time during which the grit material is projected, relative to the speed of the ribbon, and a width of the zone of surface damage sufficient to avoid alignment difficulties is readily attainable by selecting a particular spray nozzle. Expended grit material may be conveniently recovered from the surface of the ribbon, preferably at a position between the projecting facilities and the damage-free scoring facilities.

DESCRIPTION OF THE DRAWING

FIG. 1 is a plan view of a glass ribbon conveyor system having damage-free score initiating facilities incorporating features of the present invention.

FIG. 2 is a side elevated view of the conveyor system shown in FIG. 1.

DESCRIPTION OF THE INVENTION

Figure 3:
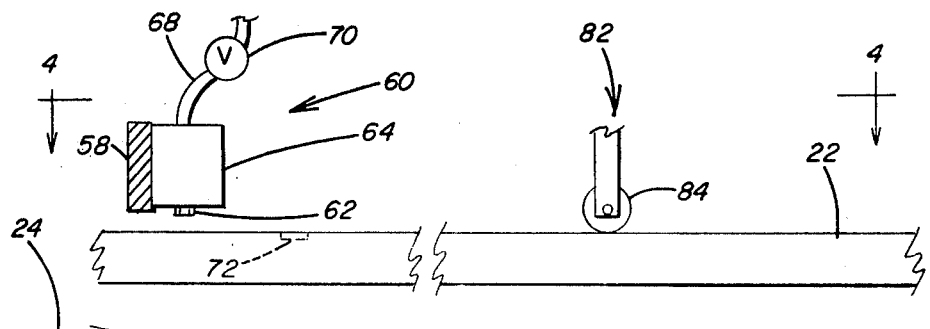
FIG. 3 is an elevated side view in partially schematic form having portions removed for purposes of clarity showing the relative positions of a surface damaging facility and a damage-free scoring wheel incorporating features of the present invention.

FIGS. 1 and 2 illustrate a glass ribbon conveyor system 20 of the type which may be used for advancing a glass piece, e.g., glass ribbon 22, in the direction of arrow 24 along a ribbon movement path. The conveyor system 20 includes a ribbon scoring station 26 having a longitudinal scoring station 28 incorporating features of the present invention and a lateral scoring station 30.

The lateral scoring station 30 is not limiting to the present invention, and may be any of the types used in the art for imposing a conventional lateral score. The term "conventional score" as used herein is defined as a score or fracture extending from a major surface of the piece into the thickness of the piece. The term "damagefree score" is used generically herein to include subsurface scores and pseudosubsurface scores; where "subsurface score" is defined as an essentially spall or wing-free discontinuity or fissure that is within the thickness of the refractory piece and extends substantially perpendicular to the major surfaces thereof but does not extend to or connect either major surface of the piece; and where "psuedosubsurface score" is defined as a discontinuity or fissure in a piece of refractory material that extends substantially perpendicular to its major surfaces, that does not appear itself to extend or connect to either major surface, but which is accompanied by a microscopic zone of damage, essentially spall or wing-free, which extends between its tip and the major surface of the piece.

Generally, the lateral scoring station 30 includes a bridge 32 mounted above and transverse to the ribbon movement path 24. A scoring assembly 34 powered by motor 36 moves along the bridge 32, preferably at an oblique angle to the ribbon movement path 24 so that score lines 40 are generally perpendicular to the movement path 24. A bridge arrangement that may be used in the practice of the invention, although not limiting thereto, is taught in U.S. Pat. No. 3,244,337, which teachings are hereby incorporated by reference. The lateral scoring station 30 may be located either upstream or downstream of the longitudinal scoring station 28.

The longitudinal scoring station 28 generally includes a surface-damaging facility 42, a surface clearing facility 44, and a damage-free score generating facility 46 which cooperates to generate longitudinal scores 50, 52, 54 and 56 in the glass ribbon 22.

Figure 4:
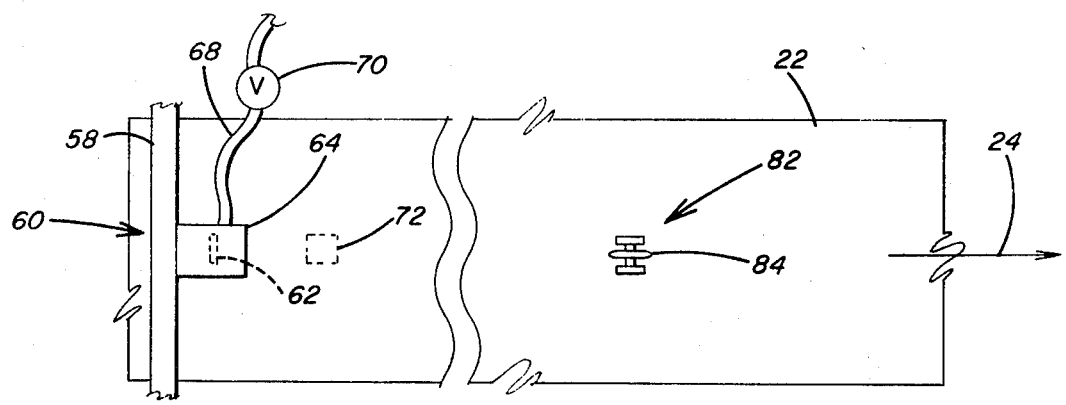
FIG. 4 is a view taken along line 4—4 of FIG. 3.

The surface-damaging facility 42 may include a bridge 58 which spans the ribbon 22 and supports a plurality of particle projectors 60 in close proximity to the surface of the ribbon 22. With reference to FIGS. 3 and 4, the particle projectors 60 may include a nozzle 62 of a prescribed configuration, and a body portion 64 which may serve as a reservoir for grit material. The body portion 64 is connected to a source of pressurized air 66 (shown only in FIG. 2) by an air line 68 and a valve 70. The particle projectors 60, when actuated, serve to bombard a selected area of the surface of the ribbon 22 with grit material to create a zone of surface damage 72 on the ribbon 22.

Grit materials which may be used in the practice of the invention include, among other things, silicone carbide #120; carborundum of 150 grit; and aluminum oxide of 220 grit.

With reference to FIGS. 1 and 2, the surface-clearing facility 44 may be mounted on the conveyor system 20 intermediate the surface damaging facility 42 and the damage-free score generating facility 46 to remove expended grit material from the surface of the ribbon 22, prior to its arrival at the score generating facility 46. The precise form of the surface-clearing facility 44 is not limiting to the invention and may include vacuum, pressurized air, or brushing means to accomplish the removal of the expended grit materials. Of course the present invention may be practiced absent the use of surface-clearing facilities 44, particularly where the selected grit material poses no potential problems if permitted to remain upon the surface of the ribbon 22.

With continued reference to FIGS. 1 and 2, the score-generating facility 46 includes a bridge 74 to which is mounted a plurality of scoring devices 76, 78, 80 and 82 of the type capable of propagating a damage-free score in the ribbon 22, e.g., those taught in U.S. Pat. Nos. 3,865,293; 3,865,673; 4,027,562; 4,057,184; 4,102,227; 4,137,803; and, 4, 213,550; which teachings are hereby incorporated by reference. Preferably each of the scoring devices 76, 78, 80, and 82 include a scoring wheel 84 of the type having an arcuate scoring surface which is sized and loaded during operation according to the teachings of U.S. Pat. No. 4,057,184.

As briefly discussed above, it is recognized that a damage-free score may be initiated within the ribbon 22 when a properly shaped, sized and loaded scoring wheel 84 encounters an appropriate zone of surface damage on the ribbon 22. After the damage-free score has been initiated, the scoring wheel 84 will continue to generate it within the ribbon 22 after the zone of surface damage has advanced beyond the scoring wheel 84. Accordingly, the present invention contemplates that the scoring wheels 84 be mounted on the bridge 74 for easy alignment with the particle projectors 60 of the surface damaging facility 42, due to the controllable width of the zones of surface damage 72, e.g., $\frac{1}{8}$ inch (0.32 cm.) to $\frac{1}{4}$ inch (0.64 cm.). Preferably both particle projectors 60 and the scoring wheels 84 are movably mounted on their respective bridges so that the positions of the longitudinal scores 50, 52, 54, and 56 may be adjusted relative to the marginal edges of the ribbon 22.

With reference to FIGS. 3 and 4, it will be appreciated that the physical dimensions, i.e., length, width and depth of the zone of surface damage 72 are readily and precisely determinable by controlling the particle projector 60. It is considered advantageous to have such control over the zone of surface damage 72 in order to assure reliable initiation of the damage-free score by the scoring wheel 84. For example, in practice it is known to utilize scoring wheels 84 to impose damage-free scores which range in diameter from about $\frac{3}{8}$ inch (0.96 cm.) to about 5 inches (12.7 cm.). It is believed that the reliability with which damage-free scores are initiated is affected by the relative dimensions of the scoring wheel 84 and the length of the zone of surface damage 72, with greater diameter scoring wheels 84 requiring zones 72 having relatively greater lengths than smaller diameter scoring wheels, for equal reliability standards. This characteristic, although not fully understood, is believed to be due to the need for the scoring wheel 84 to "seat" itself in the zone of surface damage 72. Thus, the larger diameter scoring wheel 84, having a greater ribbon contact area, requires a longer zone of surface damage 72 to "seat" sufficiently. According to the present invention, the length of the zone of surface damage 72 is controlled by the time period during which the grit materials are projected toward the surface of the moving ribbon 22. Such time control may be conveniently effected by the operation of the valve 70 in the air line 68. A desired length for the zone of surface damage 72 is thus easily provided by controlling the time of actuation of the particle projector 60 as a function of the rate of advancement of the ribbon 22.

Although not limiting to the invention, it is preferred to provide a zone of surface damage 72 having about a $\frac{1}{4}$ inch (0.63 cm.) length with a large, e.g., 5 inch (12.7 cm.) diameter scoring wheel, and at least about a $\frac{3}{8}$ inch (0.08 cm.) length with a small, e.g., $\frac{3}{8}$ inch (0.95 cm.) diameter scoring wheel.

With continued reference to FIGS. 3 and 4, it is also believed that the depth, i.e., the dimension normal to the surface of the ribbon 22, of the zone of surface damage 72 affects the reliability of initiation of damage-free scores, as a function of the thickness of the ribbon 22. More particularly, it is believed that as the thickness of the ribbon 22 is increased, so should the depth of the zone of surface damage 72 be increased, to maintain the desired reliability of initiation for damage-free scores. According to the practice of the present invention, the depth of the zone of surface damage 72 may be conveniently controlled by adjusting the force with which grit materials are projected toward the surface of the ribbon 22 by the particle projector 60 again as a function of the rate of advancement of the ribbon 22. This result may conveniently be accomplished by adjustments made in the air pressure in air line 68 by the valve 70. In this manner, the desired depth of the zone of surface damage 72 may be achieved without the danger of ribbon fracture which might result from a technique which impacted the ribbon 22 with a solid object.

Although not limiting to the invention, a zone of surface damage 72 having a depth of about 0.002 inch (0.005 cm.) is considered satisfactory for initiating a damage-free score in a ⅛ inch (0.32 cm.) thick ribbon, while it is preferred to provide a zone of surface damage 72 having a depth of about 0.006 inch (0.015 cm.) with a ¾ inch (1.9 cm.) thick ribbon.

Additionally, and with continued reference to FIGS. 3 and 4, the width of the zone of surface damage 72 is preferably selected to a value which diminishes or eliminates alignment difficulties between the particle projectors 60 and the scoring wheels 84. To achieve this result, the nozzle 62 of the particle projector 60 may be shaped to direct a conveniently wide spray of grit material toward the ribbon 22. It has been found that about a ⅛ inch (0.32 cm.) to about a ¼ inch (0.64 cm) width is satisfactory for most spacings between the surface damaging facility 42 and the score-generating facility 46.

Thus, it will now be appreciated that the present invention provides apparatus which may conveniently be utilized to initiate a damagefree score in a refractory piece, which is widely and precisely adjustable for use with a wide range of different diameter scoring wheels and glass thicknesses. Of course, the above described apparatus represents only a preferred embodiment, as a single bridge assembly might support both the particle projectors 60 and the scoring wheels 84. Thus, the scope of the invention is defined by the claims which follow.

I claim:

1. Apparatus for initiating a damage-free score in a piece of refractory material, comprising:
   means for projecting particles of grit material toward a surface of said refractory piece to impose a selected zone of surface damage thereon;
   scoring means for imposing a damage-free score in said refractory piece;
   means for moving said refractory piece and said scoring means relative to one another along a movement path;
   means for mounting said scoring means spaced from the movement path so that said selected zone of surface damage passes said scoring means to initiate a damage-free score in said refractory piece.

2. The apparatus as set forth in claim 1 further comprising:
   means for controlling said projecting means to control the physical dimensions of said selected zone of surface damage.

3. The apparatus as set forth in claim 2, wherein said controlling means comprises:
   means for controlling the time during which said particles of grit material are projected toward the surface of said refractory piece, whereby the length of said selected zone of surface damage may be controlled.

4. The apparatus as set forth in claim 3, wherein said controlling means further comprises:
   means for controlling the force with which said particles of grit material are projected toward the surface of said refractory piece, whereby the depth of said selected zone of surface damage may be controlled.

5. The apparatus as set forth in claim 1 wherein said particles of grit material are selected from the group consisting of silicone carbide, carborundum, and aluminum oxide.

6. The apparatus as set forth in claim 1 wherein said particles of grit material are sized between 120 grit and 220 grit.

7. The apparatus as set forth in claim 1 further comprising:
   means for removing said particles of grit material from the surface of said refractory piece.

8. The apparatus as set forth in claim 7 further comprising:
   means for mounting said particle removing means between said projecting means and said scoring means.

9. The apparatus as set forth in claim 1 or 3 wherein said scoring means comprises a scoring wheel having a contact area with said refractory piece when biased thereto, said contact area having a dimension in the direction of said movement path which is less than or equal to the dimension of said selected zone of surface damage in the direction of said movement path.

10. A method of initiating a damage-free score in a piece of refractory material, comprising the steps of:
    projecting particles of a grit material toward the surface of said refractory piece to impose a selected zone of surface damage thereon;
    contacting the zone of surface damage with a scoring means;
    moving said scoring means and said refractory piece relative to one another to advance said selected zone of surface damage to initiate a damage-free score; and
    continuing to move said scoring means and said refractory piece relative to one another in a movement path to advance said selected zone of surface damage beyond said scoring means to continue to propagate said damage-free score through said refractory piece along the relative movement path.

11. The method as set forth in claim 10 further comprising the step of:
    removing expended particles of said grit material from the surface of said refractory piece after practicing said projecting step.

12. The method as set forth in claim 10 further comprising the step of:
    controlling the force with which said particles of grit material are projected to control the depth of said selected zone of surface damage.

13. The method as set forth in claim 11 further comprising the step of:
    controlling the time during which said particles of grit material are projected relative to said moving step to determine the length of said selected zone of surface damage.

* * * * *